No. 891,577. PATENTED JUNE 23, 1908.
W. H. WALLACE.
ICE CREAM COOLER AND SODA FOUNTAIN.
APPLICATION FILED FEB. 13, 1907.

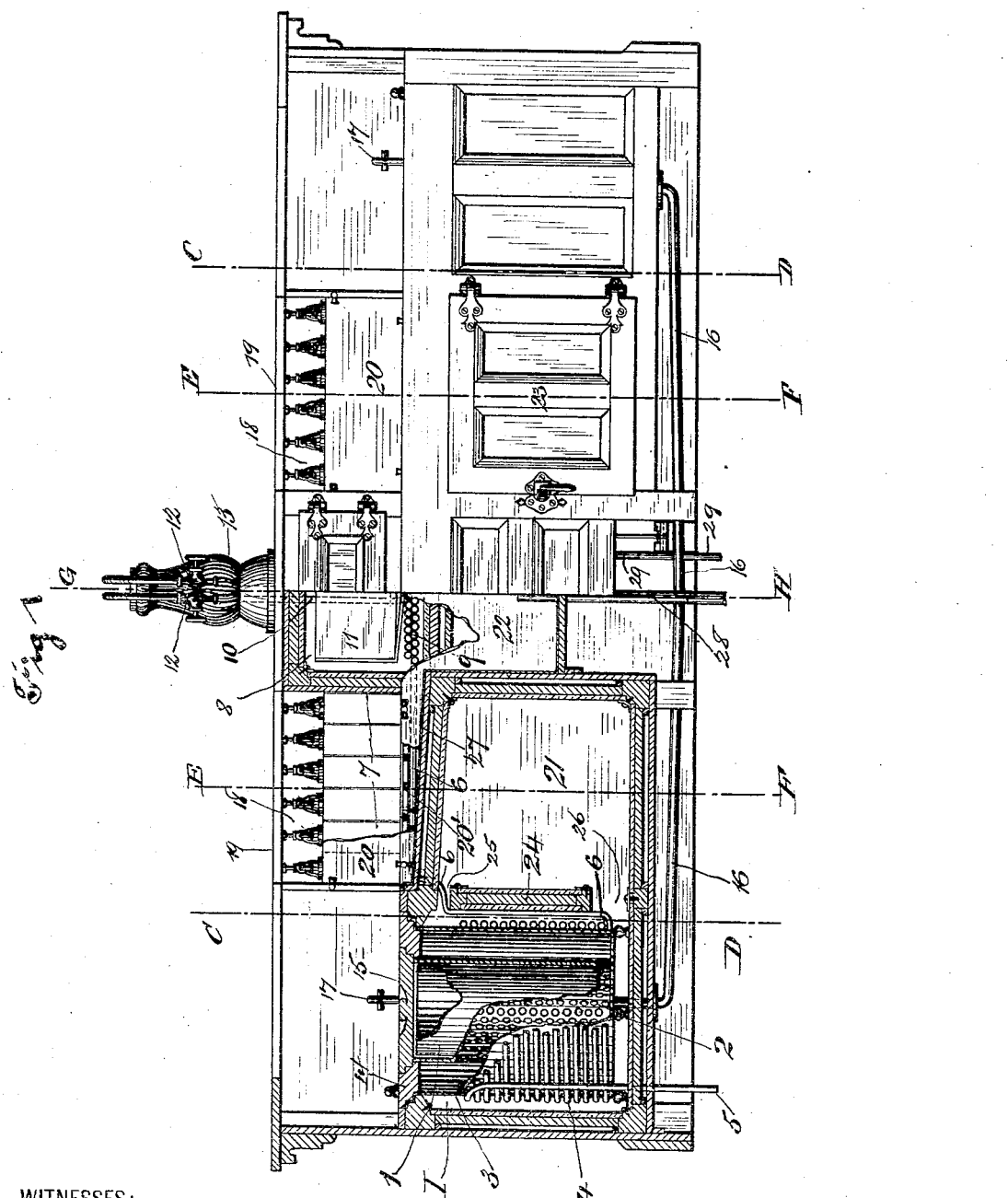

2 SHEETS—SHEET 2.

WITNESSES:
U. M. Defrees
Francis M. Springer

INVENTOR
William H. Wallace
BY
Thompson K. Bee
ATTORNEY

UNITED STATES PATENT OFFICE.

WILLIAM H. WALLACE, OF INDIANAPOLIS, INDIANA.

ICE-CREAM COOLER AND SODA-FOUNTAIN.

No. 891,577.

Specification of Letters Patent.

Patented June 23, 1908.

Application filed February 13, 1907. Serial No. 357,200.

*To all whom it may concern:*

Be it known that I, WILLIAM H. WALLACE, citizen of the United States, residing at Indianapolis, in the county of Marion and State of Indiana, have invented certain new and useful Improvements in Ice-Cream Coolers and Soda-Fountains, of which the following is a specification, reference being had therein to the accompanying drawing.

My invention relates to improvements in ice cream cooler and soda fountain cabinets.

The object of this invention is to provide a cooler that is so arranged as to be cooled by the freezing mixture used to keep the ice cream cool in order to avoid the expense of separate ice chambers to maintain the low temperature required in coolers.

In the accompanying drawings like numerals of reference designate like parts throughout the several views.

Figure 3:
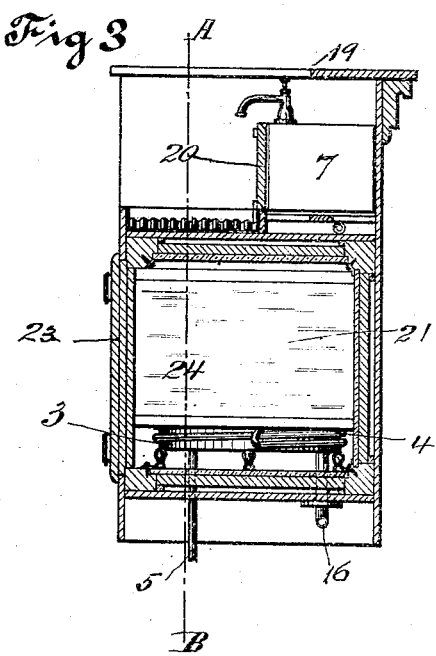
Figure 4:
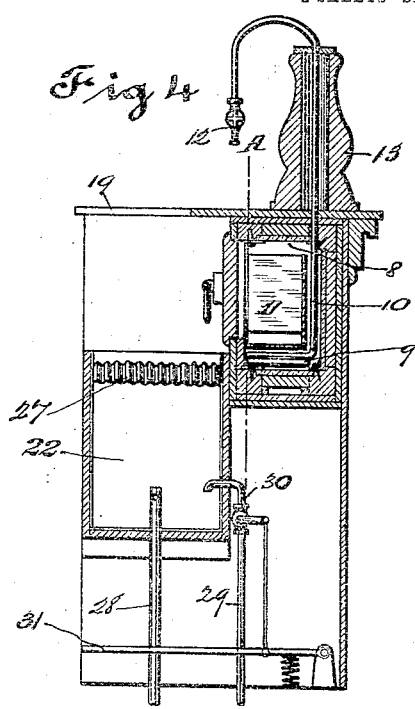
Figure 2:
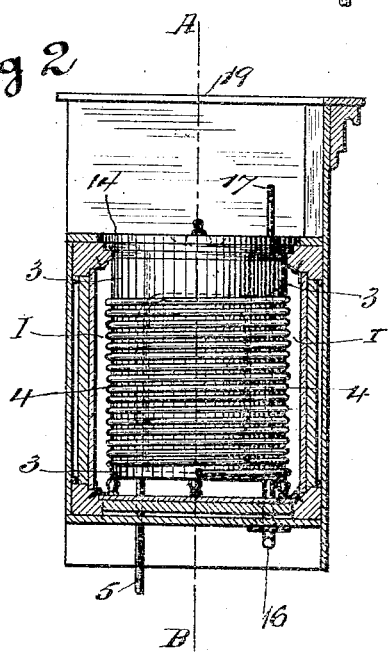

Figure 1. is an elevational view of the refrigerator cabinet showing the left hand portion in section and taken along the line A. B. in Figs. 2. 3. and 4. Fig. 2. is a transverse sectional elevational view taken along the line C. D. in Fig. 1.; Fig. 3. is a similar view taken along the line E. F. in Fig. 1; and, Fig. 4. is a similar view taken along the line G. H. in Fig. 1.

The left hand portion of the soda fountain cabinet shown in section is identical with that portion shown in elevation in construction and arrangement, so that a description of the parts shown in the sectional view will answer for the duplicate parts not shown in the right hand portion of the cabinet.

The ice cream compartments are situated at the ends of the cabinet. The ice cream can 1 is adapted to loosely fit in the perforated cylindrical separating vessel 2 which vessel is situated centrally in the cylindrical ice tank 3 and prevents the freezing mixture contacting directly with the ice cream can so that the latter can may readily be removed and replaced by another.

The space between the perforated separating cylinder 2 and the ice containing tank 3 is filled with a freezing mixture which is usually composed of rock salt and broken ice, and maintains the ice cream contained in the can 1 at a low temperature.

A pipe coil 4 surrounds the ice tank 3 and a pipe 5 extends from a tank charged with carbonated water situated in a cellar under the cabinet or other convenient place, and connects at its tip end the top coil of the pipe-coils 4. The pipe 6 is connected at one of its ends to the bottom coil of the primary pipe coils 4 and extends up to and under the syrup containing vessels 7 to and into the center refrigerating chamber 8 to the secondary pipe coil 9. A pipe 10 connects said coil 9 to the faucet 12 supported by the supporting standard 13.

A larger lid 14 covers the open top of the ice containing tank 3 and this lid is provided with a central opening situated over the top of the ice cream can 1 which is provided with a smaller lid 15 so that the ice containing tank 3 may be closed while removing the ice cream from the ice cream can 1.

The waste pipe 16 is connected to the bottom of the ice containing tank 3 and the same is provided for the purpose of draining said tank of melted ice when required, which is done by the removal of the plug 17. The waste pipe 16 connects with the overflow pipe 28 of the sink by which the waste water is carried to a sewer or other suitable place.

The syrup containing vessels 7 are arranged side by side in the compartment or space 18 situated near the center refrigerating chamber 8 and directly under the top 19 of the counter. A removable door 20 is provided whereby the said syrup vessels are held in place in said auxiliary refrigerating compartment 18.

Ice is placed in the compartment formed by the lining 11 which is situated in the chamber 8 for the purpose of cooling the carbonated water flowing through the secondary pipe coils 9 and also to supply a current of cold air to the space under the supporting rack 20' supporting the syrup containing vessels 7 to maintain said vessels at a low temperature to prevent a fermentation of the syrups contained in said vessels.

The secondary refrigerating chamber 21 is situated between the ice cream compartment I and the center portion; and the sink 22 is situated at the center portion of the cabinet, and the said compartment is provided with a door similar to the door 23, and said compartment is used as a refrigerating chamber for which it is well adapted being located adjacent the ice cream cooling tank, and chamber I is readily maintained at a low temperature by the freezing mixture surrounding the ice cream can 1.

The partition 24 situated between the chamber I and the chamber 21 does not extend from the bottom to the top of said chamber 21 but said partition is constructed so as to provide the top and bottom air spaces 25 and 26 through which spaces air freely circulates between the chambers I and 21.

Over the top outer wall of the secondary chamber 21 is a drip board 27 which is inclined downwardly toward the sink 22. The sink 22 is preferably situated at the center of the cabinet in order to be near the faucets 12 in order that the glasses used in dispensing the beverages may be washed with convenience.

An overflow or waste pipe 28 through which the surplus water of the sink 22 flows maintains the water in said sink at a constant level. A water supply pipe 29 provided with a suitable valve 30 operated by a foot treadle 31 supplies the tank or sink 22 with fresh water when such is required.

The exterior walls and partitions of the refrigerator and the cooling chambers may be lined with any known non-conducting material used in the manufacture of refrigerators.

I claim:—

1. The combination with a counter, dispensing faucets, and a refrigerating chamber situated at one end of said counter, of a refrigerant tank situated in said chamber, a removable ice cream can situated in said refrigerant tank, a perforated cylinder surrounding said ice cream can within said refrigerant tank, and a pipe coil surrounding said refrigerant tank and in contact with the surface thereof.

2. The combination with a counter, dispensing faucets, and a chamber situated under and at one end of said counter, of a refrigerant tank situated in said chamber, a removable ice cream can in said tank, a perforated separating cylinder situated centrally in said refrigerant tank and adapted to receive said ice cream can, a pipe coil surrounding said refrigerant tank and in contact with the outer surface thereof, and refrigerating chamber adjacent to said end chamber and connecting therewith to be cooled by the refrigerant, said latter chamber having upper and lower air circulating openings connecting with said end refrigerating chamber.

In testimony whereof I affix my signature in presence of two witnesses.

WILLIAM H. WALLACE.

Witnesses:
THOMPSON R. BELL,
FRANCIS M. SPRINGER.